No. 748,341. Patented December 29, 1903.

UNITED STATES PATENT OFFICE.

PAUL BEZ, OF LÉRAN, FRANCE.

PRODUCT FOR PREVENTION OF FURRING IN BOILERS.

SPECIFICATION forming part of Letters Patent No. 748,341, dated December 29, 1903.

Application filed July 2, 1902. Serial No. 114,136. (No specimens.)

*To all whom it may concern:*

Be it known that I, PAUL BEZ, canner, a citizen of the Republic of France, residing at Léran, Ariége department, in the Republic of France, have invented certain new and useful Improvements in Products for the Prevention of Furring in Boilers, of which the following is a specification.

The present invention relates to a product intended not only to prevent furring in boilers containing natural or purified waters, but also to allow of heating under pressure in ordinary boilers a dense solution of various salts or their equivalents, thereby both keeping the boiler clean and making a better use of the heat generated, this being done without the formation of adhesive deposits and without disassociating of the chlorids.

As disincrusting substances I use, preferably, a mixture of barium chlorid, tannin, and mucilaginous, pectic, and gelatinous matters coming from tanning operations. The said mixture is approximately composed as follows: barium chlorid, two hundred and sixty parts; purified tannin, forty parts; mucilaginous matters, twenty parts.

To disincrust boilers to which natural waters more or less charged with alkaline terreous salts have been fed, it only requires comparatively small quantities of the above mixture—for example, such quantities as will increase the density of the water to the extent of a few tenths of a degree Baumé.

The said disincrusting mixture used alone in the specified small quantities is advantageous in that it prevents the crystallization of the calcareous salts and that it exercises no injurious influence on the sheet metal of the boilers either by itself or through the products of decomposition to which it gives rise; but the important feature of my invention consists in adding to the feed-water such a quantity of suitable soluble matters as will notably increase the density of the water and will cause the impurities arising from the disincrusting action to be maintained in suspension. For this purpose I preferably add to the feed-water a quantity of the hereinbefore-specified disincrusting mixture considerably greater than that required to produce the precipitation of the alkaline terrous salts. For example, I use the said disincrusting mixture in such a proportion that the density of the water in the boiler will rise to 5°, 10°, 20° Baumé and even more.

Instead of the disincrusting mixture specified above I may without any departure from the principle of my invention use other disincrusting substances to precipitate the alkaline terrous salts contained in the feed-water and also other soluble substances—for example, sodium chlorid—to increase the density of the water and maintain the insoluble matters in suspension. The said soluble substances may be the same as those mentioned in the example given or they may be different the one from another.

As feed-water any kind of natural water more or less charged with salts and even sea-water may be used. To the contrary of the ideas which are now prevalent I preferably use waters which are freely charged with salts.

The sulfates and the barium chlorid are broken up and barium sulfate is formed. This is a substance which is tenuous and insoluble and one which does not adhere to the boiler. The new chlorids thus formed, eminently soluble, will be indecomposable by the heat on account of the presence of numerous polychlorids opposed, as is well known, to the decomposition of instable chlorids. The tannins will decompose the bicarbonates and carbonates to give with their salts insoluble and light lacs in suspension. The gelatinous and mucilaginous matters will give complex products in suspension with all the salts, either in solution or on the point of being precipitated through excess of concentration. The high density given to the waters by the salts in solution facilitates the suspension of the impurities which are formed. Well, now, the said impurities in suspension, subjected to the conveying influence, constitute as many elements for conveying the heat which is thus circulated and transmitted through the liquid mass. Dense water holding in dissolution a salt boils at a higher temperature than distilled water. Tumultuous ebullitions will be suppressed by reason of the presence of the impurities in suspension, which increase the number of points where steam bubbles are formed, and consequently facilitate regular ebullition without water being carried along, as shown by Gernez. The steam generated in this way will therefore be very dry. The metal plates of the boilers remaining black, although very clean, will keep their greatest power of emission and their greatest conductibility—that is to say, that they will always transmit under the best conditions the heat supplied by the furnace to the water.

From the foregoing it will be seen that my process considerably increases the production of steam per square meter of heating-surface and makes a better use of the heat generated.

There is no inconveniency in putting into the boiler large quantities of the disincrusting mixture above specified, because, on the one hand, the said mixture does not attack the metal plates and, on the other hand, the losses through being carried away or through decomposition under the influence of the heat amount to nothing.

The reactions which take place between the calcareous salts and the above-mentioned disincrusting mixture take place also between the latter and the tartars heretofore produced even when the latter are very hard, so that my process allows of cleaning boilers in which tartar has been formed.

The chief advantages of my process are as follows: It maintains the metal plates of the boilers constantly clean without corroding the same, it prevents water being carried along, and it allows the use of very calcareous or selenetical waters and even of impurified sea-water.

I claim—

1. A product for preventing furring in boilers, comprising an admixture of barium chlorid and tannin.

2. A product for preventing furring in boilers, comprising two hundred and sixty parts of barium chlorid and forty parts of tannin by weight.

3. A product for preventing furring in boilers, comprising an admixture of two hundred and sixty parts of barium chlorid, forty parts of tannin, and twenty parts of mucilaginous substances.

In testimony that I claim the foregoing as my invention I have signed my name in presence of two subscribing witnesses.

PAUL BEZ.

Witnesses:
EDMOND BLÉTRY,
MAURICE ROUX.